S. N. STOWELL.
AUTOSLED.
APPLICATION FILED MAY 19, 1917.
1,258,496.
Patented Mar. 5, 1918.
2 SHEETS—SHEET 2.
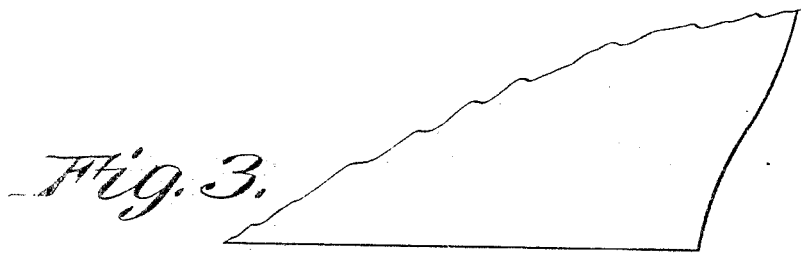
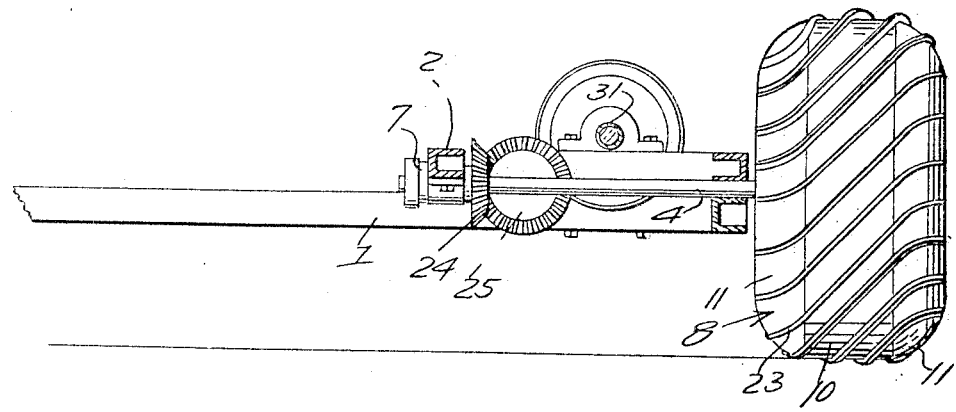
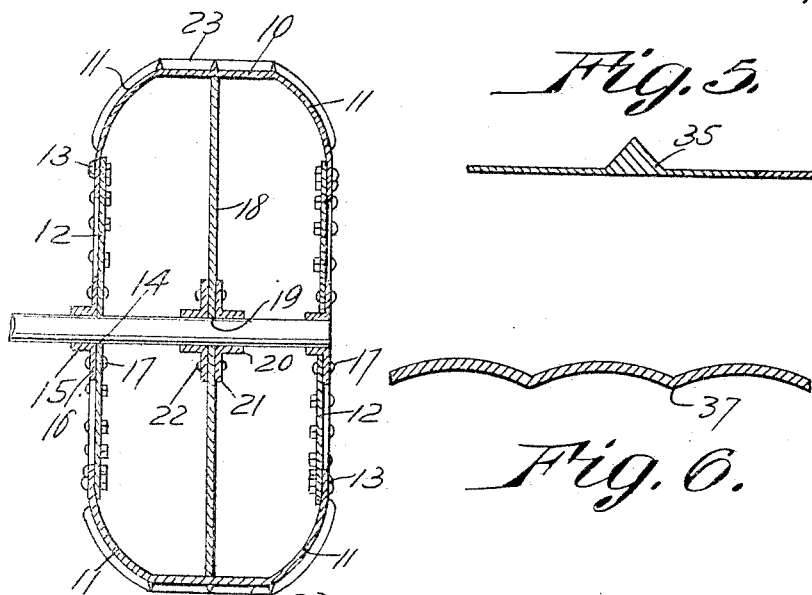
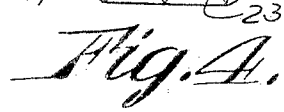
Inventor
Samuel N. Stowell,
By Talbert H Parker
Attorneys

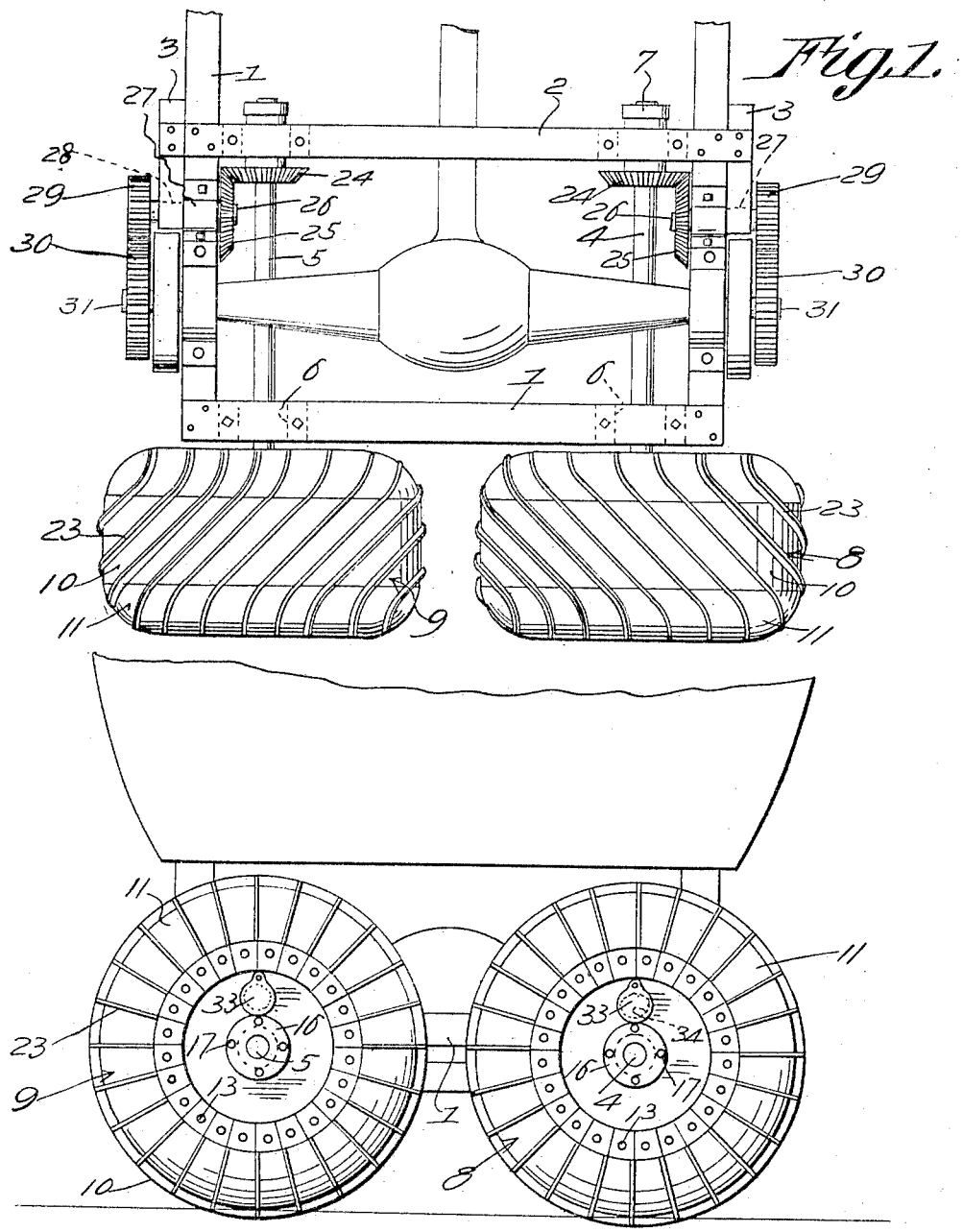

UNITED STATES PATENT OFFICE.

SAMUEL N. STOWELL, OF REXBURG, IDAHO.

AUTOSLED.

1,258,496. Specification of Letters Patent. Patented Mar. 5, 1918.

Application filed May 19, 1917. Serial No. 169,605.

*To all whom it may concern:*

Be it known that I, SAMUEL N. STOWELL, a citizen of the United States, residing at Rexburg, in the county of Madison and State of Idaho, have invented certain useful Improvements in Autosleds, of which the following is a specification, reference being had therein to the accompanying drawing.

The present invention has reference generally to improvements in motor vehicles and more particularly relates to an auto sled.

It is the principal aim and object of the present invention to provide improved ground engaging propelling means operably connected to the driving means of a motor vehicle such as an automobile and arranged to support the rear end of the automobile and to propel the automobile either forwardly or reversely over the ground so as to especially adapt the automobile for use on snow and ice.

More particularly, the present invention includes the provision of a novel cylindrical propeller being designed to serve as a runner in addition to having a propelling action, the operation of the improved device being controllable through the usual transmission of the motor vehicle.

The invention as a further improvement contemplates the provision of novel ground engaging means or cleats on the outer face of the propeller.

Still further, the present invention embodies the improved means for operably connecting an opposed pair of the combined propellers and runners so that they will rotate simultaneously with the actuation of the driving shaft of the motor vehicle but in opposite directions to each other so as to overcome and prevent a skidding action usually incident to motor vehicles.

Among the other aims and objects of the present invention may be recited the provision of a device of the character mentioned with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention, should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the spirit of the invention or the principle of operation of the various parts.

The invention is clearly illustrated in the accompanying drawings, in which:—

Figure 1 is a top plan view of the invention operably connected to an automobile.

Fig. 2 is a rear end elevation thereof.

Fig. 3 is a side elevation of the invention in an operative position.

Fig. 4 is a vertical section through one of the propellers.

Fig. 5 is a sectional detail of a modified form of tread for the propeller.

Fig. 6 is a sectional detail of another modified form of tread for the propeller.

Similar characters of reference are employed in all of the above described views, to indicate corresponding parts.

Referring now, more particularly, to the accompanying drawings, there is illustrated the frame of a motor vehicle such as an automobile, being designated in its entirety by the numeral 1 while connected to the sides thereof is a transversely extending bar 2 the outer ends of which are reinforced with respect to the side bars by means of short reinforcing bars 3.

Spaced longitudinal shafts 4 and 5 are now provided, the outer ends being journaled in suitable bearings 6 in the rear end pieces of the frame while the inner ends are journaled in thrust bearings 7 in the transverse bar 2 so as to prevent longitudinal movement of the shafts 4 and 5 during actuation in a manner that will become hereinafter apparent.

With a view toward providing the improved ground engaging and propelling means for supporting the rear end of the automobile there is employed in the present instance a pair of propellers indicated in their entirety by the numerals 8 and 9 respectively carried by the shafts 4,—5. Each of these propellers consists of a cylindrical body 10 the front and rear edges of which are rounded as indicated by the numeral 11. Front and rear circular plates 12 are provided being bolted or otherwise rigidly secured as indicated by the numeral 13 on the free ends of the rounded portions 11. These plates are provided with central openings 14 which are arranged about the shafts 4—5 while collars 15 are also arranged about the shafts 4—5 and have flanges 16 extending therefrom and rigidly secured to the plates 12 about the openings 14 by means of suitably fastening devices 17. The collars are rigid with respect to the shafts 4—5 so that the propellers will turn with the shaft. A reinforcing partition 18 has the outer edges thereof rigidly connected intermediate the ends of the casing and provided with a central opening 19 for arrangement about the shafts 4—5 while other collars 20 have their flanges 21 arranged on opposite sides of the plates about the openings and are secured to the plates by suitable fastening devices 22, the collars in turn being rigidly connected to the shafts 4—5.

In order to insure of a forward or reverse movement of the automobile the propellers are provided with suitable ground engaging means. In the present instance each propeller has the outer surface of the body as well as the curved portion thereof provided with cleats or ribs 23 spirally arranged thereon and as indicated in Fig. 1 the cleats or ribs 23 on the propeller 8 are arranged in a different direction than those on the propeller 9 so as to prevent skidding of the machine in a manner that will become hereinafter apparent. Because of the spiral arrangement of the cleats it will be appreciated that during rotation of the propellers they have a worm-like action on the ground to consequently move the automobile in a corresponding direction in which they are actuated. Of course, it will likewise be appreciated that owing to the rounded portions 11 the propellers serve in the capacity of runners so as to operate freely over the snow or ice on the ground.

As intimated, suitable means have been provided for operably connecting the shafts 4—5 to the usual driving means of a motor vehicle. In reducing the invention to practice a convenient and satisfactory form consists of beveled gears 24 carried by the shafts 4—5 and meshing with miter gears 25 carried by the stub shafts 26 which are journaled in the bearings 27 on the sides of the frame 1 and in the bearing openings 28 in the short reinforcing bars 3. Small gears 29 are carried by the opposite ends of the stub shafts 26 and mesh with large gears 30 rigidly carried by the rear axle 31 of the motor vehicle, instead of the customary ground wheels. Of course, when it is not desired to use the attachment the same can be readily detached therefrom and the usual wheels not shown can be mounted on the respective ends of the axle. By the arrangement of the transmission just described it will be appreciated that the speed of the propellers is greater than the speed of the engine of the automobile not shown to consequently assure of an effective operation of the device.

In order to permit of access to the body of the propeller, doors 33 are swingingly connected to the plates to close the small openings therein and through which the hand and arm of the mechanic may be passed.

In Fig. 5 there is shown a modified form of ground engaging means. In addition to the spirally arranged cleats or ribs 35 the inner ends of each of the ribs are turned outwardly as indicated by the numeral 36.

In Fig. 6 there is shown still another form of ground engaging cleats. In this embodiment the spirally arranged ribs 37 are formed by pressing the body as well as the curved portions outwardly.

The operation of the invention may be reviewed as follows:

Assuming that the parts have been assembled in the manner described and it is desired to propel the automobile over the ground, the automobile is started in the usual manner and rotary motion is transmitted from the rear axle through the gears 30 and 29 to the stub axles 26 and owing to the miter gears 25 and 24 rotary motion will be imparted to the shafts 4 and 5 so as to consequently rotate the shafts 4 and 5 in opposite directions to each other. Inasmuch as the propellers 8 and 9 are carried by the respective shafts 4 and 5 they will also be rotated in opposite directions. Because of the spiral arrangement of the sharpened cleats or ribs during rotation of the propellers the said cleats will have a worm-like action on the snow or ice to consequently propel the automobile in a corresponding direction to the actuating means therefor. Likewise owing to the rounded portions 11 the propellers act in the capacity of runners and ride freely over the ground. Since the direction of rotation of the propellers is toward each other it will be appreciated that skidding of the vehicle is obviated.

As many changes could be made in the above construction and many apparently widely different embodiments of this invention could be made without departing from the scope thereof, and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention, which, as a matter of language might be said to fall therebetween.

Having thus fully described this invention, what is claimed as new and desired to be secured by Letters-Patent, is:—

1. The combination with the frame and driving axles of a motor vehicle, of a pair of spaced longitudinal shafts journaled in the frames, ground engaging propellers on the outer ends of the shafts and each including a cylindrical body the front and rear edges of which are rounded, plates inclosing the respective ends of each body and formed with central openings, a transverse partition in each body and provided with a central opening, collars carried by the plates and the partitions near the openings for rigid engagement with the shaft when the propellers are attached thereto, spirally arranged cleats on the outer surface of each propeller, the cleats on one propeller extending in different directions from the cleats on the other propeller, and means for operably connecting the longitudinal shafts to the drive shaft of the vehicle so as to consequently rotate the propellers in a direction toward each other.

2. In combination with the frame and driving axles of a motor vehicle, of a pair of spaced longitudinal shafts carried on the frame, ground engaging propellers on the outer ends of the shafts, stub shafts journaled in the frame and operably connected to the longitudinal shafts and also operably connected to the respective ends of the drive shafts so that during operation of the drive shaft the propellers will be rotated in a direction toward each other.

3. The combination with a frame and driving axles of a motor vehicle, of a pair of spaced longitudinal shafts journaled in the frame, means for preventing longitudinal movement of the shafts and the frame, ground engaging propellers on the outer projecting ends of the shafts, beveled gears carried by the longitudinal shafts adjacent one end thereof, stub shafts journaled in the sides of the frame, beveled gears carried by the inner ends of the stub shafts and meshing with the beveled gears on the longitudinal shafts, other gears mounted on the outer ends of the stub shafts, and gears carried by the projecting extremities of the driving shafts and meshing with the last mentioned gears on the stub shafts so as to consequently rotate the propellers toward each other.

In testimony whereof I affix my signature.

SAMUEL N. STOWELL.

Copies of this patent may be obtained for five cents each, by addressing the "Commissioner of Patents, Washington, D. C."